Nov. 21, 1939.  W. H. FORD  2,180,872
MEANS AND METHOD FOR MACHINING CURVED SURFACES
Original Filed June 4, 1938  2 Sheets-Sheet 1
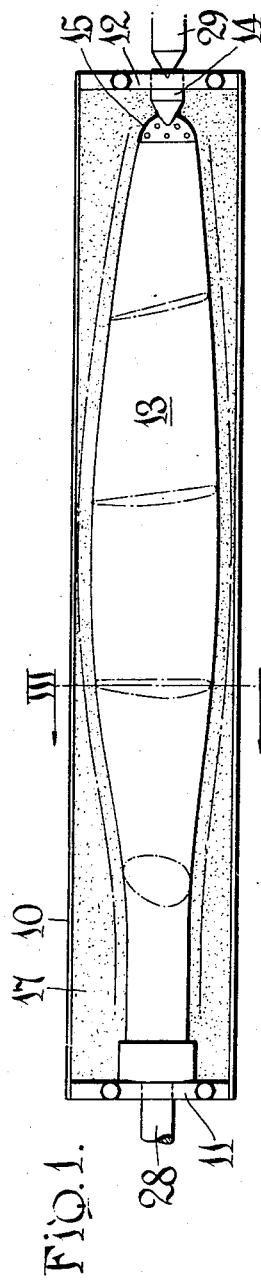
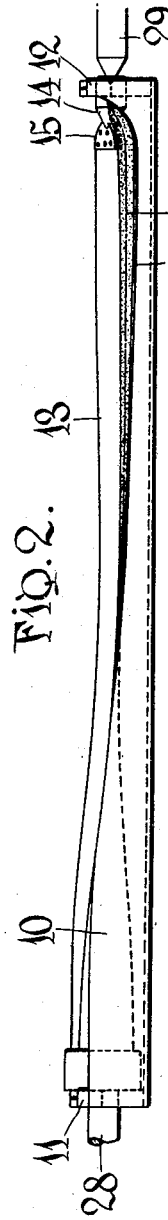
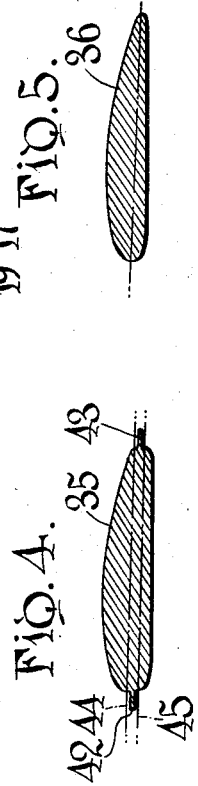
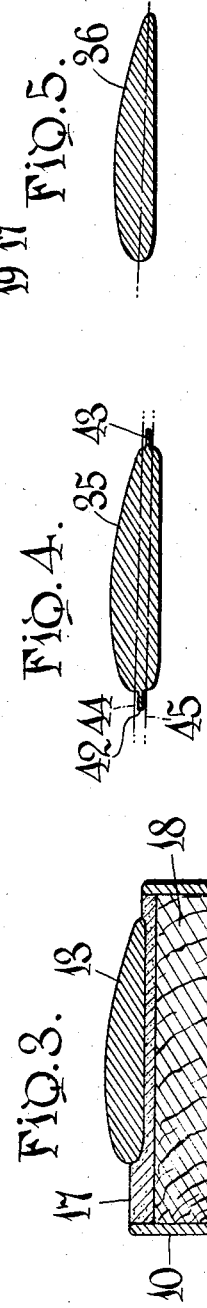
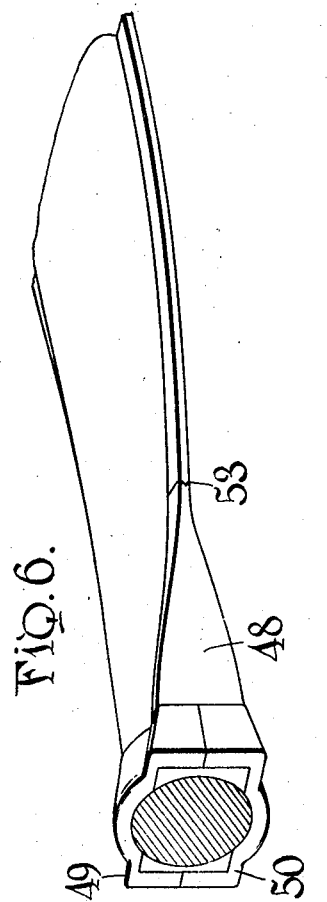
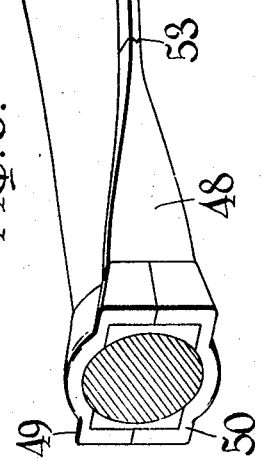
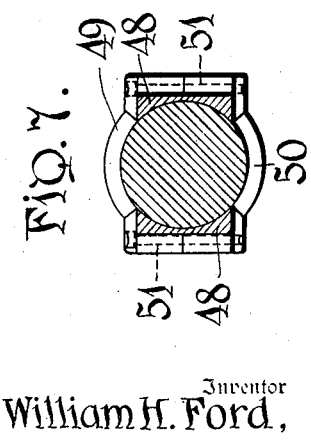
Inventor
William H. Ford,
Bean, Brooks, Buckley & Bean.
Attorneys Nov. 21, 1939.  W. H FORD  2,180,872
MEANS AND METHOD FOR MACHINING CURVED SURFACES
Original Filed June 4, 1938  2 Sheets-Sheet 2
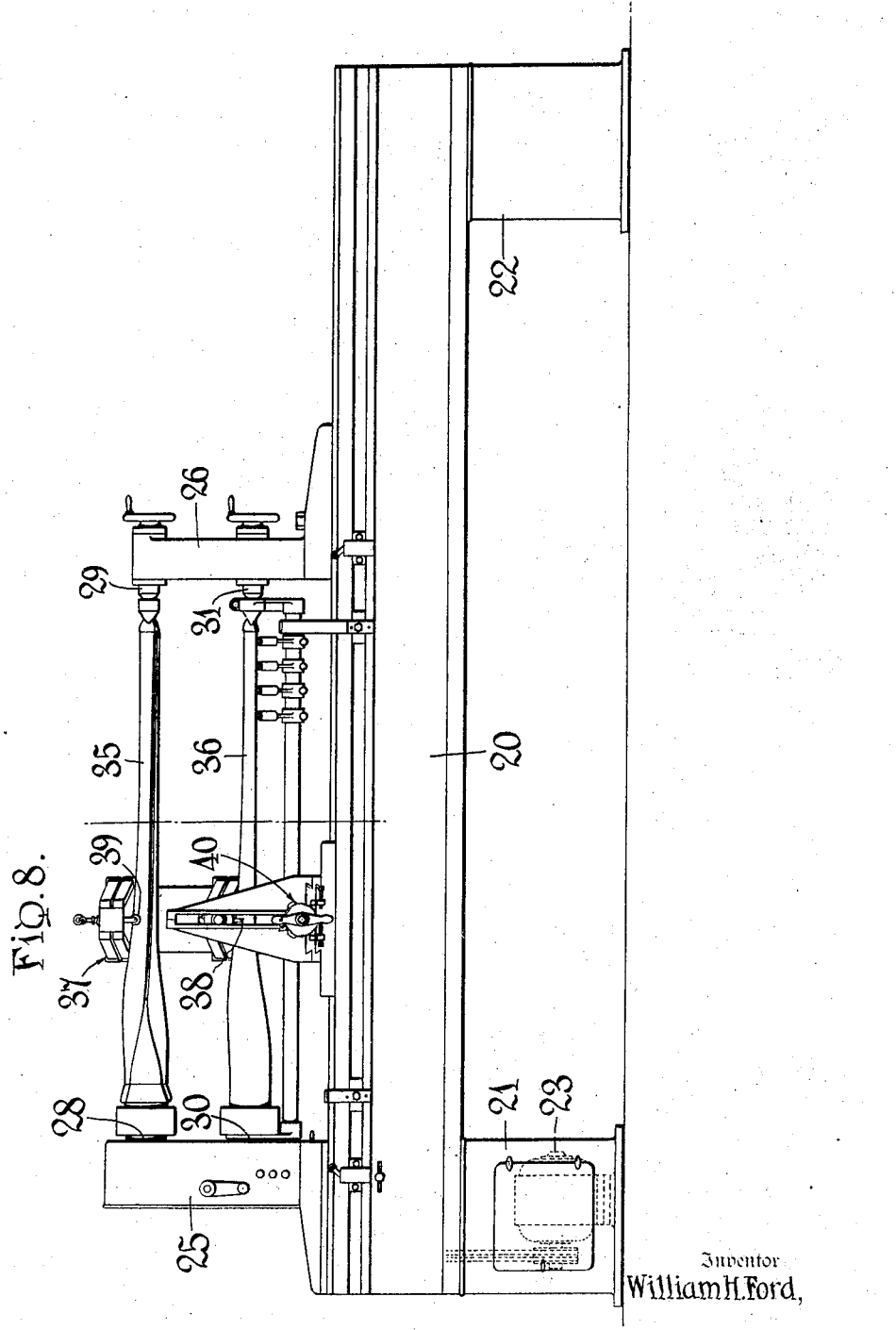
Inventor
William H. Ford,
Beau, Brooks, Buckley & Beau.
Attorneys Patented Nov. 21, 1939

2,180,872

UNITED STATES PATENT OFFICE 2,180,872

MEANS AND METHOD FOR MACHINING CURVED SURFACES

William H. Ford, Williamsville, N. Y.

Original application June 4, 1938, Serial No. 211,874. Divided and this application November 22, 1938, Serial No. 241,753

15 Claims. (Cl. 90—62)

This invention relates to a method and means for machining propeller blades and like surfaces and this application is a division of my co-pending application Serial No. 211,874, filed June 4, 1938.

Machine tools have heretofore been proposed for surfacing irregular work pieces. These machines are usually of the milling machine type wherein a rapidly rotating cutter is employed. Machines of this general class have been proposed for the specific purpose of finishing propeller blades for airplanes or the like, but up to the present time none of these machines has given satisfaction in practical use.

In prior practices, while machine tools were used to a certain extent to machine propeller blades to match templates at spaced cross sectional points along the length of the blade in size and contour, it was found necessary to accomplish the major portion of the finishing by the use of hand tools or hand guided tools for removing the material between such cross sectional points. This combination of machine and hand work requires the expenditure of approximately a week's time in the finishing of a single blade, while by use of the means and method of the present invention only a small fraction of that time is required. Such wholly automatic machines as have been proposed have not operated in such manner as to permit their use in actual production.

My present invention is herein shown and described in connection with the surfacing of airplane propeller blades, but it is to be understood that the device of the invention and the method set forth may be employed in other applications and in fact wherever it is desired to impart a smooth machined surface to an analogous irregular or non-planar surface or profile, particularly in metal working or in working with other materials whose nature permits them to be machined in a similar manner. Exemplary forms of the means of my present invention and of the apparatus which is involved in the pursuance of the method of my invention are illustrated in the accompanying drawings, in which:

Fig. 1 is a top plan view of means used in producing a master element for ultimately controlling the cutting mechanism of a profile finishing machine;

Fig. 2 is a side elevational view thereof;

Fig. 3 is a cross sectional view taken approximately on the line III—III of Fig. 1;

Fig. 4 is a transverse cross sectional view through a master element;

Fig. 5 is a transverse cross sectional view through a finished work piece;

Fig. 6 is a detailed perspective view of that portion of a master element which lies adjacent the inner or hub end thereof;

Fig. 7 is a transverse cross sectional view through a master element adjacent the inner or hub end thereof; and Fig. 8 is a general front elevational view of the machine which forms the subject matter of my aforesaid co-pending application and is illustrative of one type of machine in which the device of my present invention may be employed and in which the present method of producing propeller blades may be culminated.

The machine which forms the subject matter of my co-pending application referred to above, in comparison with machine tools of conventional form, is to some extent analogous, in the manner in which the cut is taken, to a conventional shaper, in that there is provided a tool which reciprocates across or along the surface of a work piece, which latter is stationary so far as the direction of reciprocation of the tool is concerned. While the method and means forming the subject matter of the present invention may be successfully employed in association with that machine, it is to be understood that the teachings of this invention are advantageously applicable to the production of irregularly curved surfaces with profiling machines of other types using a master control element, as for instance, machines which embody rapidly rotating cutting tools.

The first steps in proceeding according to the principles of my present invention relate to the production of a master element for ultimate use in controlling the movements of a cutting tool in a profile finishing machine. To this end I preferably employ, referring particularly to Figs. 1 and 2, an elongate box-like structure 10. The upper portions 11 and 12 of the ends of the box-like structure may be removably constructed and normally held in position by screws or the like.

In proceeding according to the method of the present invention I dispose an actual propeller blade 13, which I desire to duplicate, in the box with the inner or shaft end thereof supported at one end of the box in an opening provided therefor and with the tip end of the blade supported by a block 14 disposed in an opening provided in the opposite end of the box. The block 14 carries a pocket or cup member 15 which receives and supports the tip end of the propeller blade. The supporting means for the shaft end of the propeller blade and the tip supporting block 14 may be secured in position in the opposite ends of the box member 10 in any convenient manner but in the illustrated instance this end is accomplished by means of the removable portions 11 and 12 respectively, and the blade is so positioned that its flat sides extend substantially horizontally.

The box member 10 is then filled with a moldable material, which may be plaster of Paris or plastic wood, to a varying level depending on the conformation of the propeller blade. This level is such that, as illustrated in Fig. 3, the upper surface of the plastic material is at all points disposed just a slight distance below the most extreme lateral projection of the edge of the propeller blade at all points. As shown in Fig. 3, wherein the plastic material is designated by the numeral 17, a filler block or blocks 18 may be employed so that a less amount in volume of plastic material is required.

The block or blocks 18 may vary in height along their length owing to the greater distance from the bottom of the propeller blade to the bottom of the box at the tip end thereof than at the hub or shaft end. Also the sides of the box may preferably be cut down to a lower height at the tip end of the propeller blade as shown at 19 so that the edge 19 more or less follows the line of the level of the plastic material at substantially all points.

With the sample or model propeller blade 13 thus positioned and supported in the box 10, I proceed with partial preparation of a master element which is ultimately to be used in actually controlling and guiding the cutting mechanism of a machine tool in the production of duplicates of the sample or model blade. For the production of such master the assembled box and propeller blade sample are placed in a suitable contour copying or duplicating machine in the position normally occupied by the control or master element thereof.

While the present method may be pursued in a variety of such machines, I shall describe its use in connection with a machine of the type forming the subject matter of my aforesaid co-pending application. That machine is shown in general elevation in Fig. 8 of the drawings herein as comprising a base member 20 supported on pedestals 21 and 22, the former of which may enclose an electric driving motor 23.

A headstock 25 and a tailstock 26 are adjustably disposed upon the base member 20 and each has a pair of spaced spindles for interchangeably supporting the opposite ends of master elements and work pieces. As seen in Fig. 8, axially aligned spindles 28 and 29 are provided upon the head- and tail-stocks respectively and a second pair of axially aligned spindles 30 and 31, also associated with the head- and tailstocks respectively, are provided in spaced parallel relation with respect to the spindles 28 and 29.

Fig. 8 shows a master element 35 supported between the upper pair of spindles 28 and 29 and a work piece 36 supported between the lower pair of spindles 30 and 31. Profile cutting mechanism designated generally at 37 is disposed between the head- and tailstocks and is arranged for longitudinal reciprocation on the bed 20. The cutting mechanism includes suitable linkage for causing a cutting tool 38 to move in a transverse vertical plane with and in response to similar movements of a master element follower or tracer 39.

In the machine of Fig. 8 the spindles are adapted to rotate synchronously and in such fashion as to cause the master element and the work piece to present substantially right angular surfaces to the tracing member 39 and the cutting tool 38 respectively. Cutting strokes are effected by longitudinal reciprocation of the cutting mechanism on the base 20. Suitable mechanism for feeding the cutting mechanism transversely as a unit is indicated at 40.

Referring now again to the production of the master elements, the assembled box 10 and propeller blade 13 are disposed in the upper position between the head- and tailstocks, which position is occupied by the master element 35 in the illustration of Fig. 8, and a blank is placed in the position occupied by the work piece 36 in the figure referred to.

The machine is then operated in the same manner as if a finished propeller were to be produced from a master element until the top of the blank is cut to exactly correspond to the exposed surface of the propeller blade 13 in the box 25 and the surface of the surrounding embedding material 17. Referring to Fig. 4, the upper surfaces of the fins 42 and 43 conform in disposition and contour to the upper level of the plastic material 17.

When the upper surface of the master element blank has been treated on one side in accordance with the foregoing, the box member 10 is removed from the cutting machine and the sample or model propeller blade 13 is taken out of the box, the plastic material 17 is removed, and the sample blade 13 is repositioned in the box with its other flat surface uppermost. The box 10 is then again filled with plastic material and the upper surface of the plastic material is here also arranged to be a short distance below the point of greatest transverse dimension of the sample blade 13 at all points along its cross section.

The box 10 and the propeller blade 13 so contained and supported therein are then again positioned between the upper spindles 28 and 29 of the head- and tailstocks 25 and 26 respectively of the finishing machine. The master blank which is still suported between the lower pair of spindles 30 and 31 is then given half a revolution so that its hitherto uncut side is in position to be acted upon by the cutting mechanism.

The vertical distance between the tracer or pattern follower 39 and the cutting tool 38, which in normal operation of the machine is fixed and unchanging, is now decreased, preferably an amount equal to the distance between the dot and dash lines 44 and 45 in Fig. 4. This is done so that the resultant master element 35 will be produced with the laterally projecting fins 42 and 43 which extend along oposite edges of the master element 35 as shown in Fig. 4. The decrease in spacing of the cutter 38 and the follower 39 is preferably an amount slightly greater than the desired ultimate thickness of the fins 42 and 43 and may be accomplished either by lowering the pattern follower 39 or by raising the cutter 38.

As has heretofore been stated, the level of the plastic material 17 is in both instances arranged to be a slight distance below the point of greatest transverse dimension of the sample blade 13 at all points. This distance is represented, for the two operations, by the space between the dotted line 44 and the top surfaces of the fins 43 and 44 in one case and the space between the dotted line 45 and the under surfaces of the fins 43 and 44 in the other case and provides for an overlap in finishing opposite sides of an ultimate propeller blade from the master element 35.

To sum up, the vertical distance which the follower 39 is lowered or which the cutting tool 38 is raised is equal to the vertical thickness of one of the fins 42, 43 plus twice the distance from the point of greatest transverse dimension of the sample blade down to the level of the plastic material 17. It will further be observed that while the upper and lower surfaces of the master element 35 are exact duplicates in every respect of the upper and lower surfaces of the sample or model propeller blade 13, the master element is at all points thicker than the sample or model blade by exactly the distance which the cutting tool 38 was raised or the follower 39 was lowered.

In employing the master element 35, which has been formed as described, in the production of one or more finished propeller blades such as the one illustrated in transverse cross section at 36 in Fig. 5, any suitable pattern-copying cutting or finishing machine may be utilized but for the sake of exemplification I shall describe the use of the master element 35 in connection with a machine of the kind shown in Fig. 8. The master element 35 is disposed in the position between the headand tailstock which it occupies in Fig. 8 and a usually cast or otherwise roughly preformed work piece is likewise positioned between the head and tailstocks as designated at 36 in Fig. 8.

Suitable vertical adjustment of either the cutting means or the follower 39 is then made to compensate for the greater thickness of the master element 35 than the desired finished thickness of the work piece 36. One side of the work piece is finished in a manner which will now be apparent and the master element 35 and the work piece 36 are reversed, that is, rotated one half of a revolution, and the other side of the work piece is finished, after again making suitable vertical adjustment of the spacing of the follower 39 and the cutting tool 38.

As will be seen from an inspection of Figs. 1 and 2, the inner portion of a propeller blade, and consequently of the master element, is usually of nearly circular cross section, and to avoid cutting too far on the side of the cutting tool or the side of the work piece only limited upper and lower portions of this nearly circular end of the work piece are finished in the operation so far described. To thus limit the finish at the end of the work piece referred to, means may be provided on the master element, and I refer now to Figs. 6 and 7, wherein it will be seen that the fins 42 and 43 are cut off adjacent the circular portion and that enlarging continuations 48 are substituted therefor.

One such enlarging continuation 48 is provided for each side of the master element and both are held removably in position by a pair of cooperating clamping elements 49 and 50 which may be secured to each other in clamping engagement as by the screws 51.

A V-shaped groove is preferably provided in the end of each member 48 at the point where it meets its associated fin and a complementary V-shaped projection of the fin engages therein, as shown at 53 in Fig. 6, to accurately locate the member 48 with respect to the fin and to support that end of the member 48. The V-shaped portion of the fin is cut back as shown in Fig. 6 and the member 48 is correspondingly formed to lock the member 48 against movement away from the body of the master element 35.

After a propeller blade has been finished on both sides in the manner heretofore described, the clamping members 49 and 50 and the elements 48 are removed from the master element 35, the master element and the work piece are disposed with the blades extending vertically and the small V-shaped unfinished portion occurring at opposite sides of the somewhat circular end of the work piece are finished.

While specific embodiments of the device and method of the present invention have been shown and described, it will be seen that such modifications may be made as appear desirable without departing from the spirit of the invention as defined in the appended claims.

I claim:

1. The method of duplicating propeller blades which comprises the preparation of a master element by embedding the major portion of the lower half of a sample propeller blade in a plastic material with the blade disposed with its major cross sectional axis disposed horizontally, permitting said plastic material to set, reproducing the contour of the exposed portion of the blade and the surrounding plastic material on a blank by suitable profiling mechanism, removing the blade from the plastic material, reversing the position of the blade and embedding the same in plastic material with its opposite face exposed, reproducing such opposite face on the opposite face of said blank, said blank being thicker than said propeller whereby a ledge is formed thereabout, the opposed faces of said ledges corresponding in contour with the surface of the plastic material surrounding the blade in the first and second steps of the method respectively.

2. The method of producing a master element for use in machines for producing duplicate propeller blades which comprises embedding the major portion of the lower half of a sample propeller blade in a plastic material with the blade disposed with its major cross sectional axis disposed horizontally, permitting said plastic material to set, reproducing the contour of the exposed portion of the blade and the surrounding plastic material on a blank by suitable profiling mechanism, removing the blade from the plastic material, reversing the position of the blade and embedding the same in plastic material with its opposite face exposed, reproducing such opposite face on the opposite face of said blank, said blank being thicker than said propeller whereby a ledge is formed thereabout, the opposed faces of said ledges corresponding in contour with the surface of the plastic material surrounding the blade in the first and second steps of the method respectively.

3. The method of duplicating propeller blades which comprises the preparation of a master element by disposing a sample propeller blade in a suitable receptacle with its major axis extending horizontally, filling said receptacle with material to a depth coinciding with an imaginary line on the edge of said propeller blade and located a slight distance below the point of maximum dimension of the major cross sectional axis of the propeller blade, reproducing the resultant composite contour of blade and filling material thus produced upon one face of a blank, removing the blade from the receptacle, similarly disposing the opposite face of the propeller blade in a receptacle and again filling with material to points slightly below the point of greatest dimension of the major cross sectional axis of the blade, reproducing such composite contour on the opposite face of the blank in such manner as to leave the resultant blank thicker than the sample propeller blade as to the dimension of the minor axis thereof, whereby a projecting fin is formed substantially about the circumference of the blank adjacent the edge thereof.

4. The method of duplicating propeller blades which comprises employing a control element having opposite faces simulating accurately the opposite faces of a propeller blade and having a fin projecting from the edges thereof between such opposite faces, the thickness of the master element being thicker than the blade to be produced by an amount at least equal to the thickness of the fin, placing said control element and a propeller blank in suitable relation with profiling machinery and with corresponding faces of the propeller blank and the master element in operative relation with respect to the machinery, reproducing one face of said master element on the corresponding face of the propeller blade by employing a cutting tool guided by a tracing element operating over one surface of the master element with said fin preventing the tracing element from leaving said surface of the control member, subsequently reversing the positions of the propeller blank and the master element to present their opposite surfaces to the cutting tool and the tracing element respectively whereby completion of surface treatment of the propeller blank is accomplished.

5. A master element for use in machine tools for duplicating propeller blades, said element comprising a body having opposed faces corresponding in form and size to the opposed faces of a propeller blade and having a fin projecting outwardly from its edges, said element being thicker along its minor cross sectional axis than the propeller blade to be produced by an amount at least as great as the thickness of said fin.

6. A master element for use in machine tools for duplicating propeller blades, said element comprising a body having opposed faces corresponding in form and size to the opposed faces of a propeller blade and having a fin projecting outwardly from its edges, said element being thicker along its minor cross sectional axis than the propeller blade to be produced by an amount at least as great as the thickness of said fin, portions of said fin being removably associated with said master element whereby, upon their removal, otherwise unfinished portions of a propeller blade may be finished.

7. A master element for use in machine tools for duplicating propeller blades having at different points along their axes substantially circular and substantially flat cross sectional contours, said element comprising a body having opposed faces corresponding in form and size to the opposed faces of a propeller blade and having a fin projecting outwardly from its edges adjacent said flat cross sectional contour, and a removable ledge portion adjacent the substantially circular cross sectional contour.

8. A master element for use in machine tools for duplicating propeller blades having at different points along their axes substantially circular and substantially flat cross sectional contours, said element comprising a body having opposed faces corresponding in form and size to the opposed faces of a propeller blade and having a fin projecting outwardly from its edges in the region of said flat cross sectional contour, said element being thicker along its minor cross sectional axis than the propeller blade to be produced by an amount at least as great as the thickness of said fin, and a removable ledge portion projecting outwardly from said body in the region of the substantially circular cross sectional contour of said element.

9. A master element for use in machine tools for duplicating propeller blades having at different points along their axes substantially circular and substantially flat cross sectional contours, said element comprising a body having opposed faces corresponding in form and size to the opposed faces of a propeller blade and having a fin projecting outwardly from its edges adjacent said flat cross sectional contour, and a removable ledge portion adjacent the substantially circular cross sectional contour, said fin and said removable ledge portion merging to form an uninterrupted ledge along the edge of said element.

10. A master element for use in machine tools for duplicating propeller blades having at different points along their axes substantially circular and substantially flat cross sectional contours, said element comprising a body having opposed faces corresponding in form and size to the opposed faces of a propeller blade and having a fin projecting outwardly from its edges adjacent said flat cross sectional contour, and a removable ledge portion adjacent the substantially circular cross sectional contour, said fin and said ledge portion being in abutment and forming in cooperation a substantially smooth uninterrupted ledge along said element.

11. A master element for use in machine tools for duplicating propeller blades having at different points along their axes substantially circular and substantially flat cross sectional contours, said element comprising a body having opposed faces corresponding in form and size to the opposed faces of a propeller blade and having a fin projecting outwardly from its edges adjacent said flat cross sectional contour, and a removable ledge portion adjacent the substantially circular cross sectional contour, said fin and said ledge being in interlocking abutment and forming an uninterrupted ledge along the edge of said element.

12. A master element for use in machine tools for duplicating propeller blades being throughout the major portions of their length of substantially flat cross sectional contour and being adjacent one end thereof of substantially circular cross sectional contour, said element comprising a body having opposed faces corresponding in form and size to the opposed faces of a propeller blade and having a fin projecting outwardly from its edge portion adjacent said flat cross sectional contour and a removable ledge portion adjacent the end thereof which is of substantially circular cross section, said ledge portion being clamped to said body portion at the end thereof and having a portion extending to and into interlocking engagement with said fin.

13. A master element for use in machine tools for duplicating propeller blades, said element comprising a body of rigid material having a face thereof formed to correspond in contour and configuration to one face of a propeller blade, and a ledge extending along said element and having a face constituting a lateral marginal extension of the face which is formed to correspond to a face of a propeller blade, the face of said ledge extending laterally away from said propeller blade face contour in approximate coincidence with the major cross sectional axis of the propeller blade whose face is simulated by said element.

14. A master element for use in machine tools for duplicating propeller blades, said element comprising a body of rigid material having a face thereof formed to correspond in contour and configuration to one face of a propeller blade, a ledge extending along said element and having a face constituting a lateral marginal extension of the face which is formed to correspond to a face of a propeller blade, the face of said ledge being longitudinally curved to extend laterally away from said propeller blade face contour in approximate coincidence with the varying major cross sectional axes of the propeller blade whose face is simulated by said element.

15. A master element for use in machine tools for duplicating propeller blades, said element comprising a body having opposed faces corresponding in form and size to the opposed faces of a propeller blade and having a fin projecting outwardly from its edges, said fin having opposed faces, each of which constitutes a ledge extending marginally along its associated propeller blade face to provide a supporting ledge for the tracing element of a profiling machine.

WILLIAM H. FORD.